Dec. 19, 1933.   W. D. FERRIS   1,940,408
OPENING AND CLOSING MEANS WITH FRICTION RETARDATION SWIVEL
Filed May 13, 1932    2 Sheets-Sheet 1
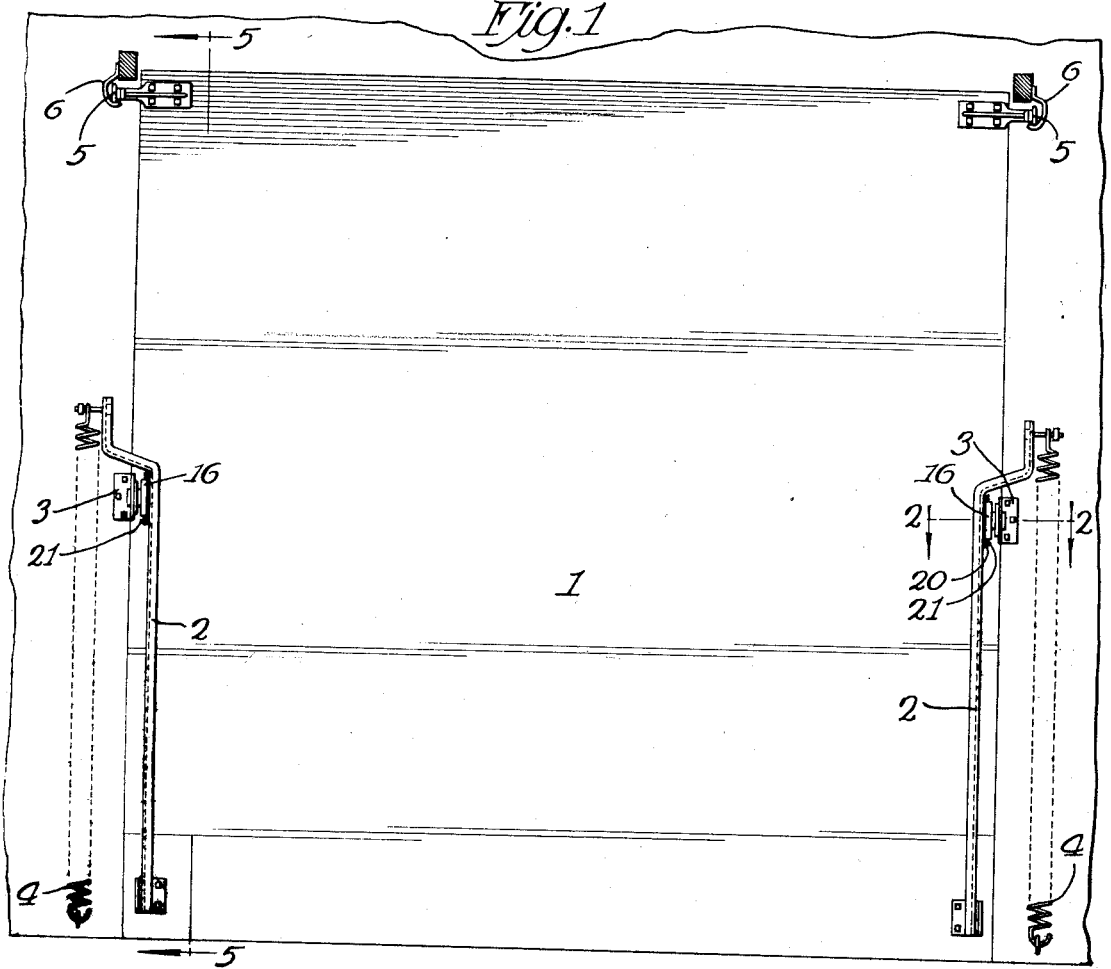
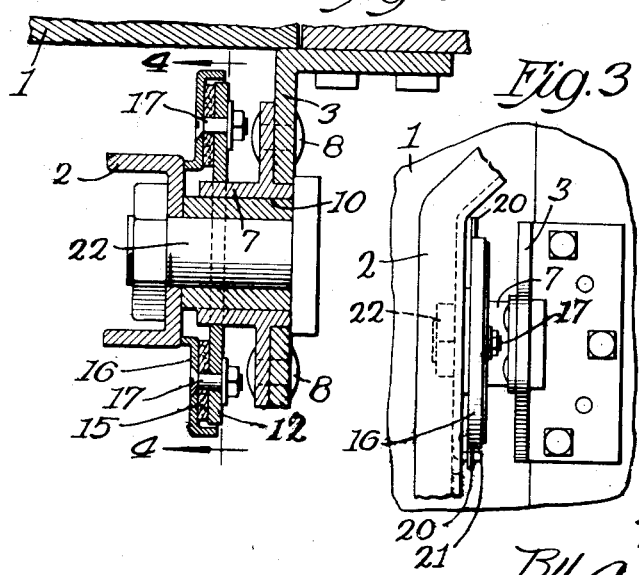
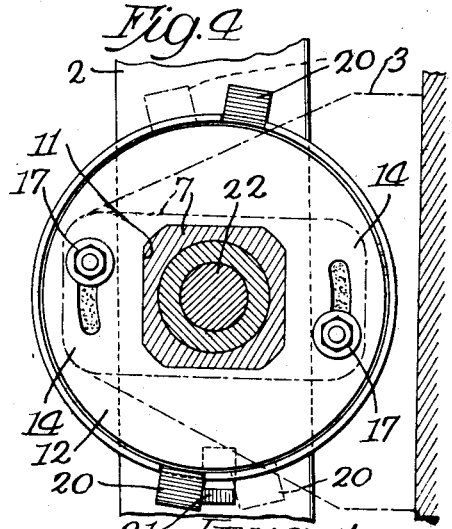
Inventor
William D. Ferris
By Arthur F. Durand
Atty.

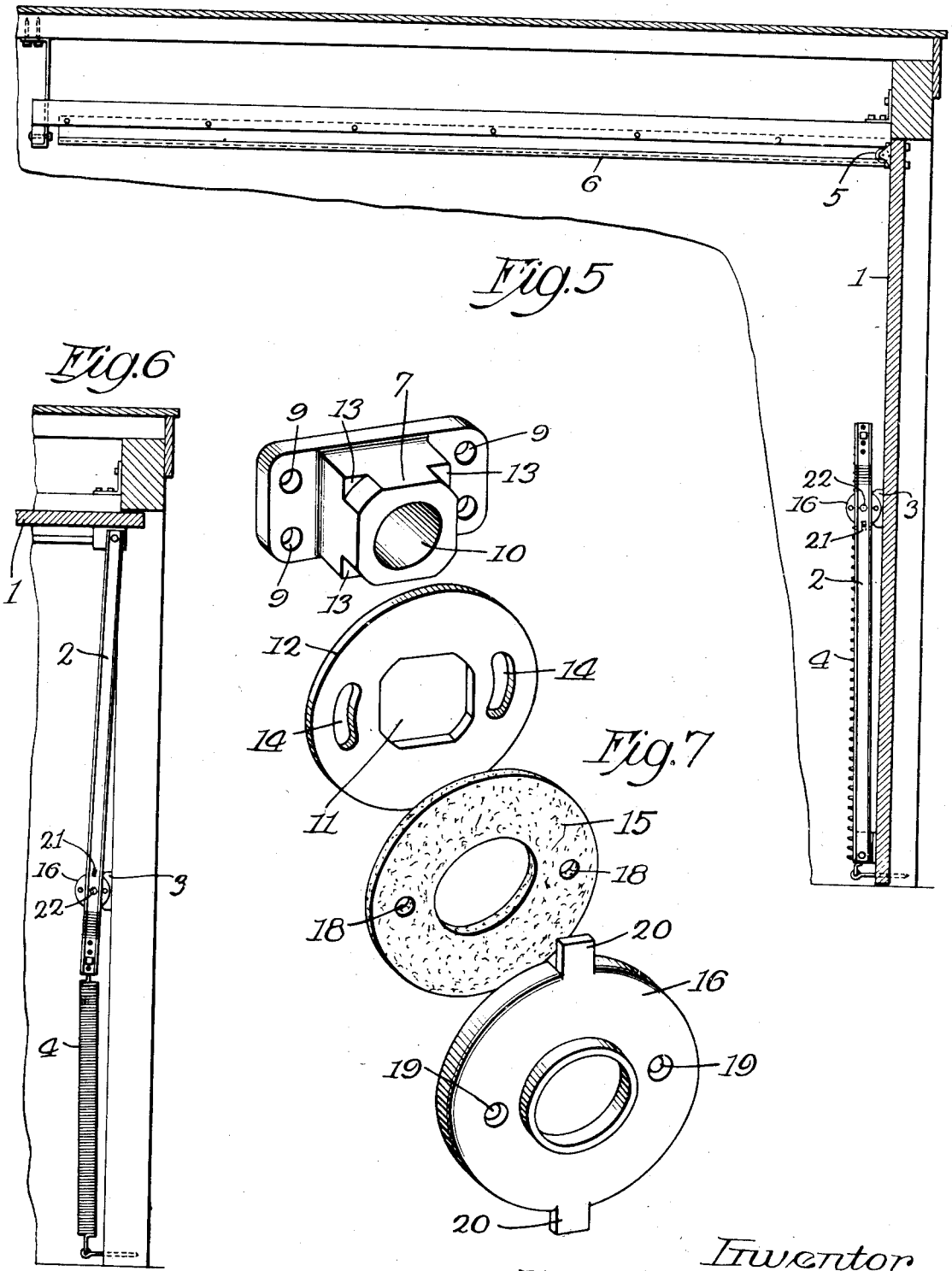

Patented Dec. 19, 1933

1,940,408

UNITED STATES PATENT OFFICE 1,940,408

OPENING AND CLOSING MEANS WITH FRICTION RETARDATION SWIVEL

William D. Ferris, Sterling, Ill., assignor to Frantz Manufacturing Co., Sterling, Ill., a corporation of Illinois Application May 13, 1932. Serial No. 611,038

11 Claims. (Cl. 20—19)

This invention relates to friction devices for pivots, and more particularly to devices of this kind for so-called overhead garage doors, and more particularly for the swivel bearings of the arms or levers by which doors of this kind are connected to the door frame.

Generally stated, the object of the invention is to provide a novel and improved construction and arrangement whereby a friction device of this character is provided, comprising, preferably, a sort of lost motion connection between the friction device and the movable part or member which is supported by the pivot or swivel of said device, whereby said part or member may have more or less movement without being retarded by the friction device, and whereby said device will serve to retard only a portion of such movement, whereby the opening of the garage door, for example, is only frictionally retarded at the end of the opening movement, and whereby in closing the door it is only frictionally retarded at the end of the closing movement, thereby to prevent the door from slamming or jolting at the end of either movement thereof.

It is also an object to provide certain details and features of construction tending to increase the general efficiency and the desirability of a friction device of this particular character.

To the foregoing and other useful ends, the invention consists in matters hereinafter set forth and claimed and shown in the accompanying drawings, in which—

Fig. 1 is an inside view of an overhead opening garage door having friction pivots or swivels embodying the principles of the invention.

Fig. 2 is an enlarged detail horizontal section on line 2—2 in Fig. 1 of the drawings.

Fig. 3 is a front elevation, on a smaller scale than Fig. 2, of the parts shown in Fig. 2.

Fig. 4 is a vertical section on line 4—4 in Fig. 2 of the drawings.

Fig. 5 is a vertical section on line 5—5 in Fig. 1 of the drawings, showing the door in closed position.

Fig. 6 is a similar view showing the door in open position, and showing certain portions broken away for convenience of illustration.

Fig. 7 is a perspective view of the frictional pivot or swivel device, showing the parts thereof separated.

As thus illustrated, the invention is employed in connection with a garage door comprising the rigid door 1, connected by arms 2 with the pivot or swivel brackets 3, mounted on the door frame, the upper ends of these arms being connected by springs 4 with the lower portions of the doorway. The upper corners of the door are provided with rollers or hangers 5, adapted to travel on the horizontal straight tracks 6 arranged overhead in the garage or other building.

Each bracket 3 has a rigid hub portion 7 connected thereto by rivets 8, inserted through the holes 9, and through similar holes in the bracket. Each hub portion or casting 7 has a cylindrical bore 10, and has its outer end shaped to fit the polygonal opening 11 in the metal disk 12, whereby this disk cannot turn on said member, and is held tightly against the shoulders 13 formed on said member. Said disk 12 is also provided with curved slots 14, and next to this disk is a friction disk 15, of cork composition, or of other suitable material, and the other side of this disk 15 is engaged by the inner side of the metal outer disk 16, as shown.

Bolts 17 are inserted through the slots 14 and the holes 18 and 19 in the disks 15 and 16, and the latter is provided with two oppositely disposed peripheral lugs 20, as shown. The adjacent arm or lever 2 is provided with a lug or stop 21, for engagement with the lugs 20, as will hereinafter more fully appear.

With the arrangement shown, the lug or stop 21 will move away from the lower lug 20, when the door starts to open, and will travel in a circular path until it strikes the upper lug 20, whereby the disk 16, and also the disk 15, will be partially rotated, to whatever extent of rotation is permitted by the length of the slots 14 in the stationary disk 12, this partial rotation of the friction device being characterized by sufficient friction to retard the final opening movement of the door. Thereafter, when the door is pulled downwardly and closed, the lug 21 on each arm 2 will move downward in a circular path until it strikes the lower lug 20, and in this way the friction device will be given another partial rotation, sufficient to properly retard the final closing movement of the door. Thus, the friction device has a lost motion connection, so to speak, with the arm or movable member 2, at each side of the doorway, with the result that during the lost motion there is no friction, while at each end of the range of movement of the arms or members 2, the lost motion ceases and the friction device develops the desired friction to properly retard the final opening and closing movement of the door.

It will be understood that each arm or lever 2 is supported on the end of the pivot or swivel pin 22 inserted through the bore 10 previously mentioned, this pivot or pin being held in place by a suitable formation of its ends, or by any suitable means, but the friction device may be used on pivots or swivels of different kinds, and while it is particularly useful in the combination shown and described, it may be used for other purposes, and on different kinds of pivots or swivels, without departing from the spirit and the broader aspects of the invention.

What I claim as my invention is:

1. In a structure of the class described, in combination with a pivoted or swiveled member, opening and closing door means supported by said member and whereby the member necessarily has the same predetermined extent of movement each time said means is opened and closed, a friction device on the pivot or swivel, and a lost motion connection between said device and said member, serving to operate said device to develop friction therein during the final motion of said door means in both the opening and closing thereof, while preventing the operation of said device during the intermediate motion of said door means in each direction.

2. A structure as specified in claim 1, said lost motion connection comprising a pair of oppositely disposed peripheral projections on said device, and means on said member for alternately engaging said projections.

3. A structure as specified in claim 1, said lost motion connection comprising a pair of oppositely disposed peripheral projections on said device, and means on said member for alternately engaging said projections, the range of movement of said member being sufficient to move each projection, when finally engaged, a distance therewith.

4. A structure as specified in claim 1, said lost motion connection comprising inter-engaging elements having operative engagement only for the final portion of the motion of said member in each direction thereof.

5. A structure as specified in claim 1, said device comprising a disk fixed against rotation on the swivel bearing, an outer disk rotatable about the axis of said pivot or swivel, and a friction disk interposed between said fixed disk and said outer disk, together with bolts holding the three disks together, the fixed disk having curved slots for said bolts, and said lost motion connection being interposed between said outer disk and said member.

6. A structure as set forth in claim 1, said member being a swinging arm forming a connection between an overhead opening door and the inside of the building, whereby said friction device is effectual to frictionally retard the final movement of said arm away from normal position, in the opening of the door, and also the final movement of said arm into normal position in the closing of the door.

7. A structure as set forth in claim 1, said member being a swinging arm forming a connection between an overhead opening door and the inside of the building, whereby said friction device is effectual to frictionally retard the final movement of said arm away from normal position, in the opening of the door, and also the final movement of said arm into normal position in the closing of the door, in combination with spring means also connected to said arm to assist in said movement away from normal position, and to cushion the return movement.

8. In a structure of the class described, in combination with a pivoted or swiveled member, a movable object controlled by said member, a friction device on the pivot or swivel, and a lost motion connection between said device and said member, serving to operate said device to develop friction therein during the final motion of said object, in both directions thereof, while preventing the operation of said device during the other motion of said object, said device comprising a disk fixed against rotation on the swivel bearing, an outer disk rotatable about the axis of said pivot or swivel, and a friction disk interposed between said fixed disk and said outer disk, together with bolts holding the three disks together, the fixed disk having curved slots for said bolts, and said lost motion connection being interposed between said outer disk and said member.

9. A structure as specified in claim 8, comprising a movable member having a lost motion connection with said outer disk.

10. A structure as specified in claim 8, said bearing having a square portion, and said fixed disk having a central opening fitting said square portion, means for mounting said bearing, and means including a movable swivel bolt for detachably holding the disks in position on said bearing.

11. A structure as specified in claim 8, comprising means for oscillating said outer disk.

WILLIAM D. FERRIS.